INVENTORS
MICHAEL MASTROSIMONE
HENRY ROSENTHAL
BY
J.B. Felchin
ATTORNEY.

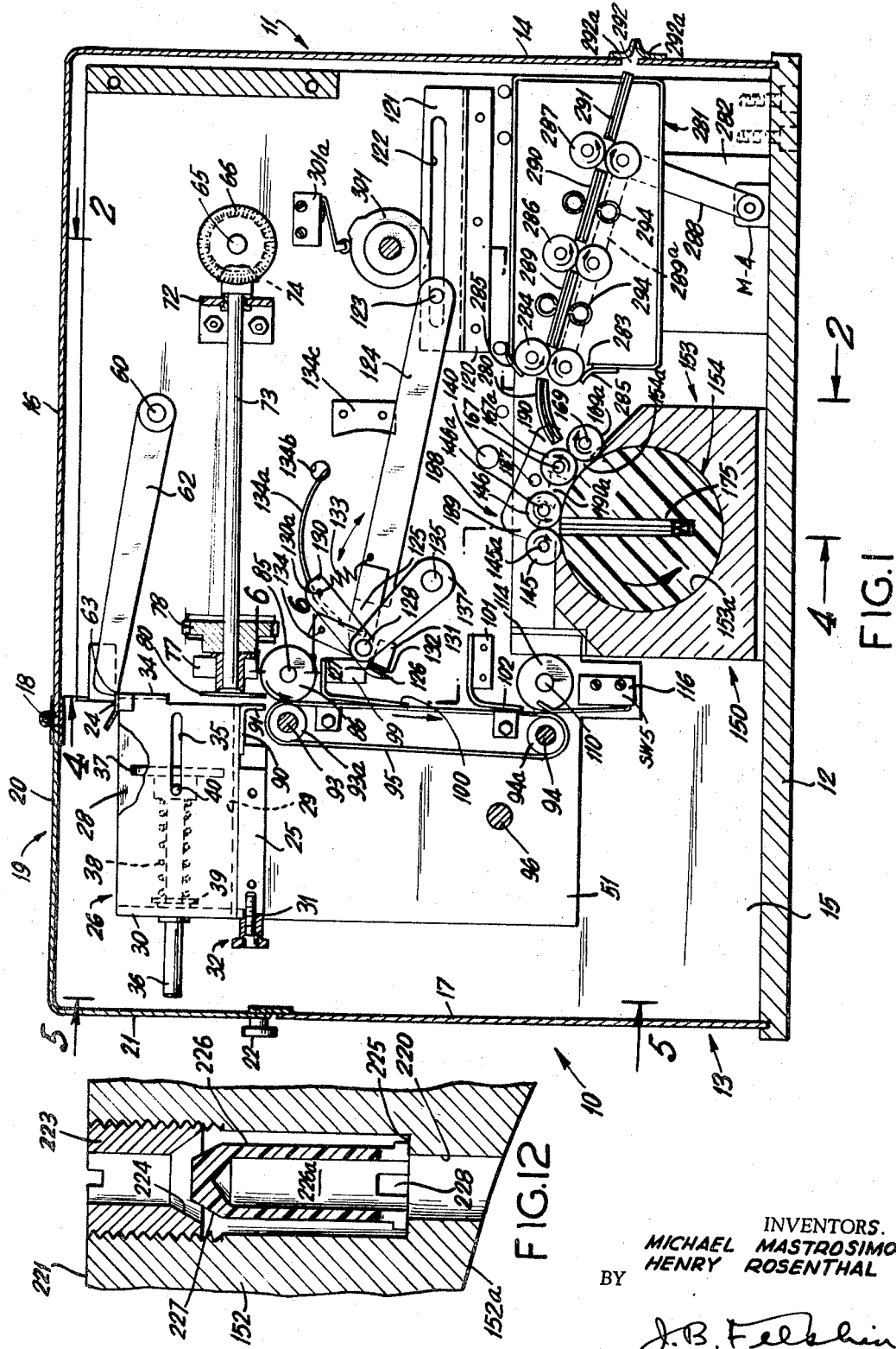

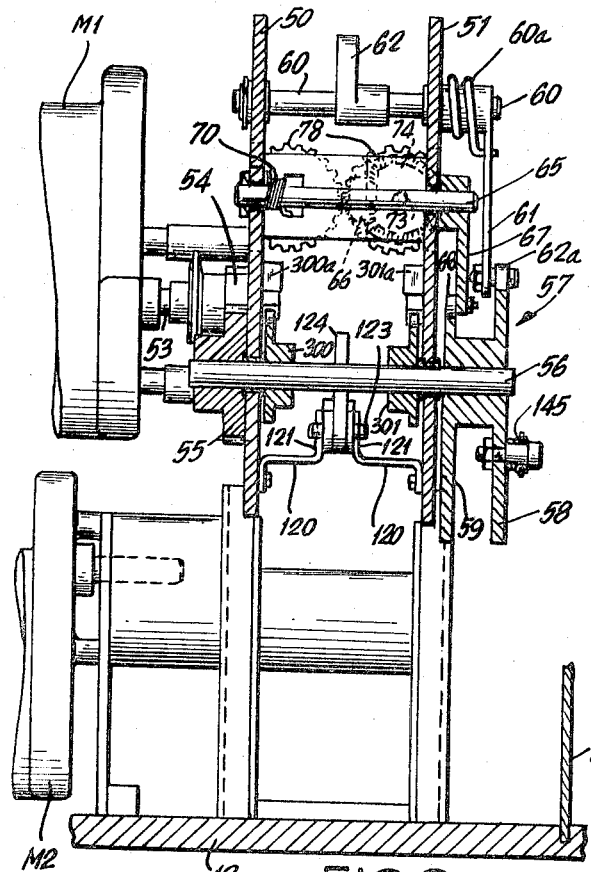
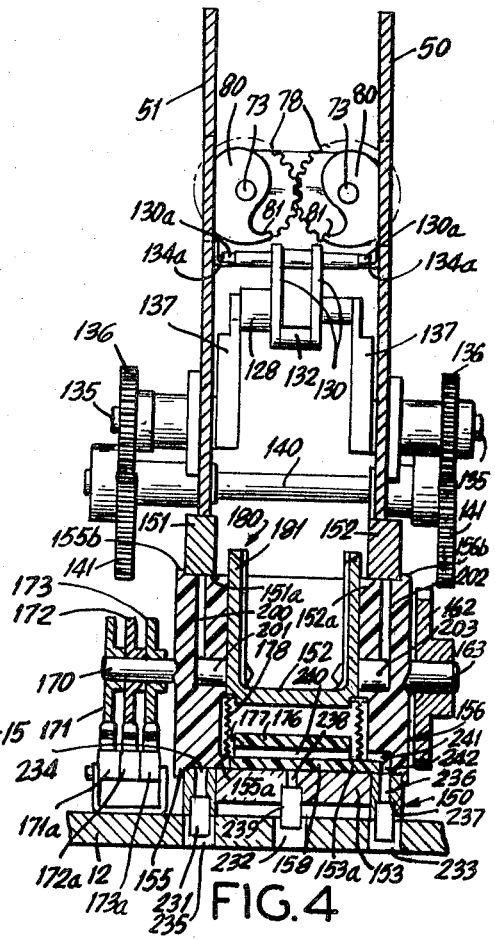
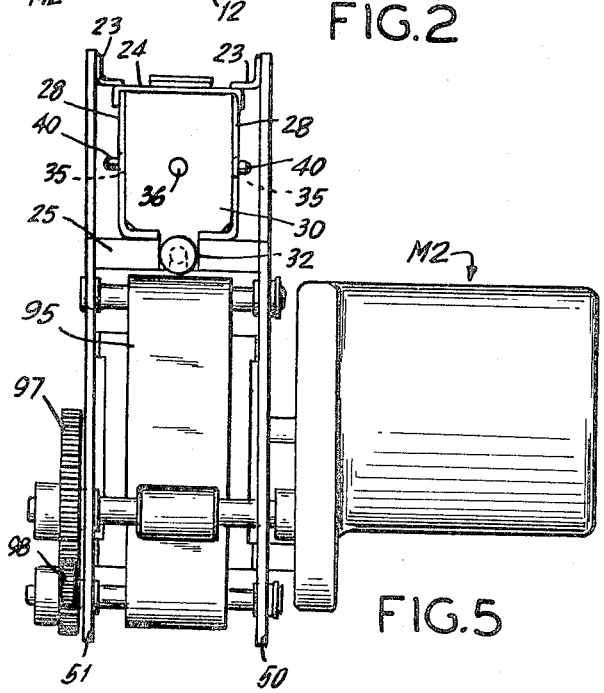
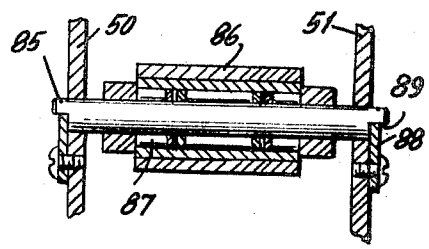

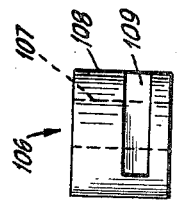
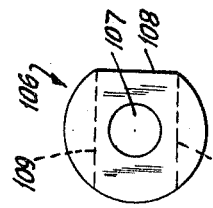
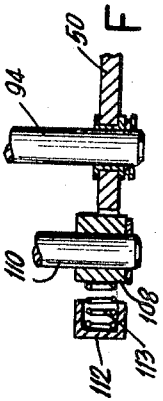
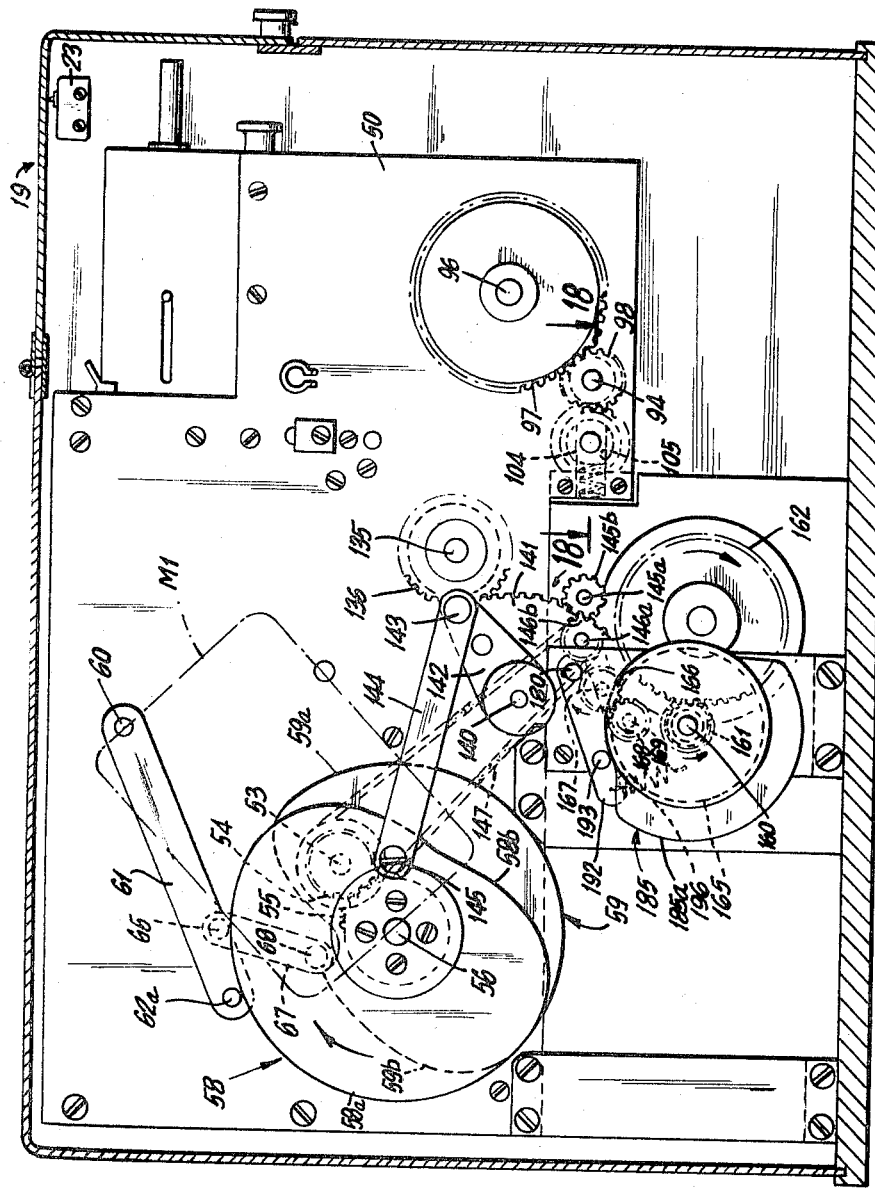

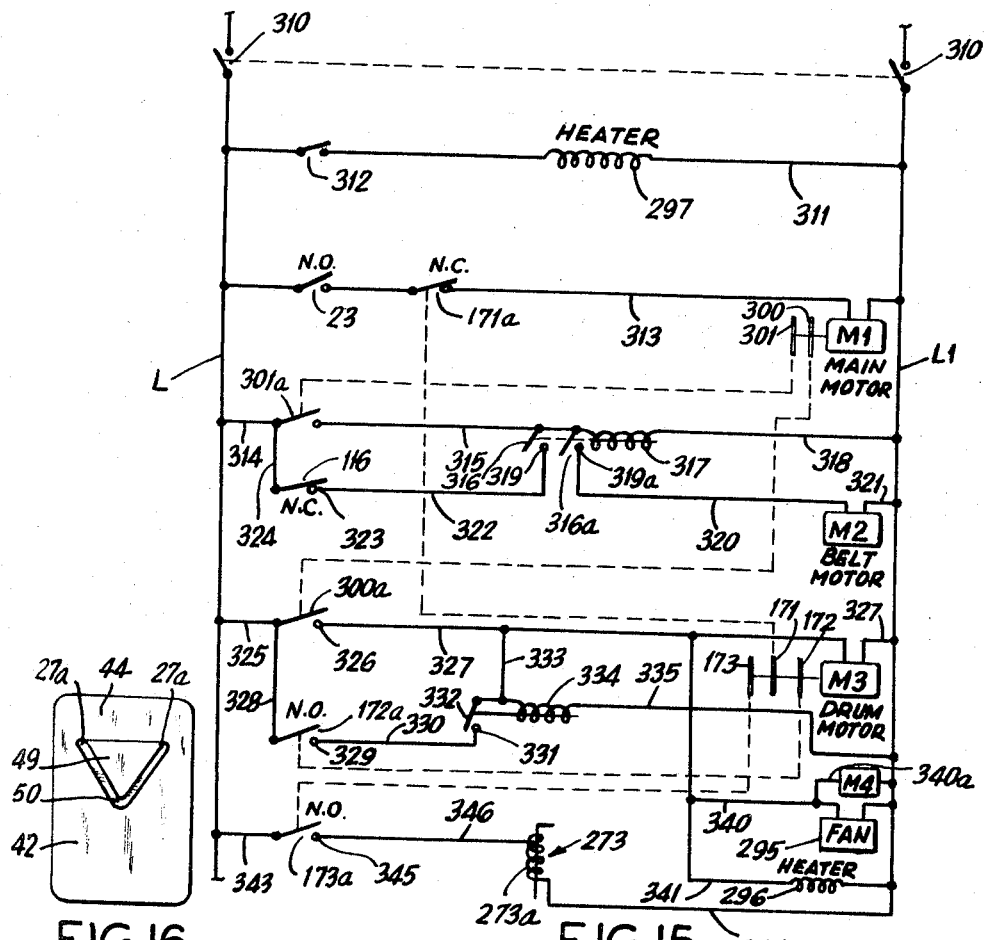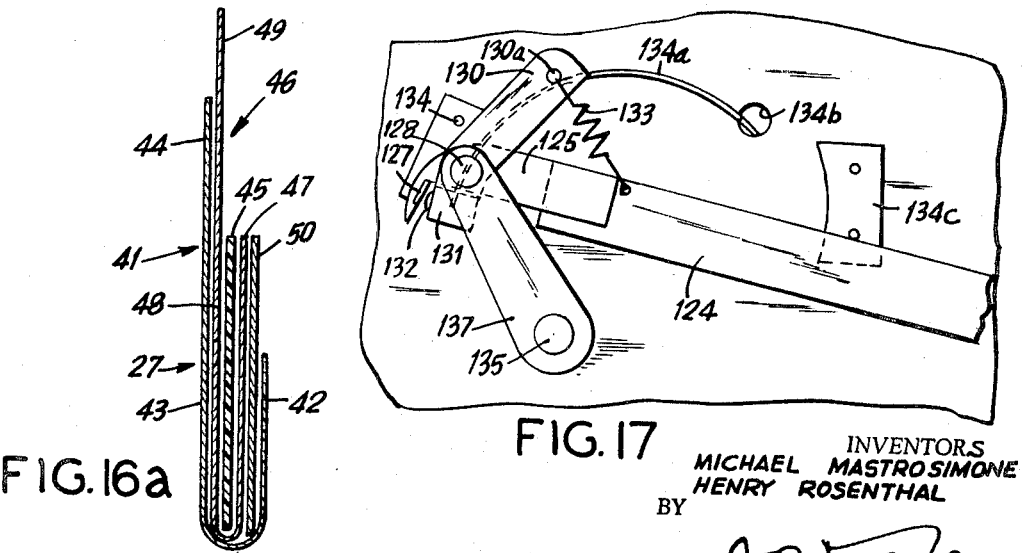

United States Patent Office 3,437,030
Patented Apr. 8, 1969

3,437,030
APPARATUS FOR REMOVING FILM FROM A PACKET AND DEVELOPING, FIXING, WASHING AND DRYING THE FILM
Michael Mastrosimone, 361 Rockaway Ave., Valley Stream, N.Y. 11581, and Henry Rosenthal, 232 Riviera Drive W., Massapequa, N.Y. 11758
Filed Oct. 15, 1965, Ser. No. 496,542
Int. Cl. G03d 3/10
U.S. Cl. 95—93    26 Claims

ABSTRACT OF THE DISCLOSURE

A magazine holds a stack of film packets each consisting of an envelope with a film therein. A device is provided for advancing the packets of the stack in the magazine. A mechanism is also provided to move the end packet of the stack from the magazine to a first position. A first motor activates the moving mechanism. An apparatus controlled by the first motor opens an envelope of the moved packet in the first position, then moves the opened envelope to a second position. Film is then extracted from the opened envelope in the second position. The extracted film is then inserted into a rotary drum. The drum is rotated to various positions. Developer liquid is supplied to the drum for developing the film. Then the developer liquid is drained. Thereafter fixer liquid is supplied to the drum and thereafter water is supplied to the drum to flush out the fixer liquid and wash the developed and fixed film. Thereafter the developed, fixed and washed film is withdrawn from the container. Air is blown onto the film removed from the container to dry the film.

---

This invention relates to apparatus for removing an exposed film or plate from a packet, and for developing, fixing, washing and drying the removed film or plate. The invention herein is particularly related to the processing of dental X-ray films but may be applied to other types of X-ray films. The invention may be in the form of a portable or fixed installation.

Dental as well as other types of X-ray photography are suitable for the purpose of diagnosis, comparison, and maintaining as an acceptable record, only when exposure, developing and fixing of the film are standardized, since the processed films must be of consistently high quality to be valuable.

Prior methods of processing film necessitate use of a dark room requiring considerable space and equipment with tanks for developing, fixing and washing, involving expensive plumbing and temperature controls. Furthermore, the operator must often run back and forth to the dark room. Each film must be removed from its packet by hand, with possible smudging of the film. Each film must be mounted on a rack and individually go through the entire process of developing, fixing and washing.

With the present methods, messiness often results due to spilling of fluids and changing films from tank to tank. Fluids must be changed regularly. The tanks must be cleaned and washed of dried salts precipitating out of the solutions. Furthermore, developing and fixing fluids are not constant in strength because of evaporation. Exposure of fluids to air would cause deterioration of activating chemicals, and by reason of depletion of activating chemicals as each film is processed.

The time factor with prior methods cannot remain constant because constant temperature is difficult to maintain with the present methods and it is difficult to maintain the strength of fluids, for which reason, films, when fully processed in accordance with the present methods, are not of constant high quality. Another factor is that air drying requires long periods of time or elaborate, expensive equipment in accordance with the present methods.

It is therefore an object of the present invention to provide highly improved apparatus which itself serves as a dark room thereby saving space which can be used for other purposes. The apparatus is compact and self-contained, the only installation required being one water line, a waste drain and an electric connection with which dentists' and medical offices are ordinarily provided. The present invention apparatus may be located in the same room where the operator is working. A number of film packets, in accordance with the present invention may be placed in a magazine from which they are automatically fed to a packet stripper or opener, and means is provided to separate and remove the exposed X-ray film from the opened packet and to thereafter process the film automatically. This apparatus may be left unattended while in operation. Furthermore, with the improved apparatus, the film is processed quickly, thereby saving considerable time. A dentist can see the finished X-ray pictures in only a few minutes, so that the patient can await the result and not have to return on another day, whereas two visits are required with present processes.

The apparatus in accordance with the present invention requires minimum maintenance and is self-washing. In accordance with the process embodying the invention the developing and fixing solutions remain constant in strength because there is no evaporation, all the fluids being contained in any closed containers such as collapsible plastic containers. Furthermore, in accordance with the present invention the films are developed in fluids which are used only once. These fluids are not reused. The apparatus embodying the present invention maintains a steady, level temperature. The strength of the fluids remains constant. Therefore, a definite time factor may be used to produce a finished film constant with highest possible quality. The apparatus embodying the invention also employs a hot air unit built into the apparatus for drying the film.

A further object of this invention is to provide an apparatus embodying the invention which is portable and wherein the water supply may feed either by gravity or by pump, and in which the water drains into a container below the apparatus. The apparatus embodying the invention may be operated on electric power of any voltage, making it possible to incorporate the present invention in a mobile dental or medical unit either for civil or armed forces use. A further object of this invention is to provide a strong, rugged and durable apparatus of the character described which shall be relatively inexpensive to manufacture, which shall be fully automatic and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

In the accompanying drawing, in which is shown an illustrative embodiment of this invention.

FIG. 1 is a vertical cross-sectional view of the apparatus embodying the invention;

FIG. 2 is a cross-sectional view taken on line 2—2 of FIG. 1 with the positions of some of the parts moved for clarity;

FIG. 3 is a vertical cross-sectional view of the apparatus taken at a different plane from FIG. 1 and in an opposite direction with the positions of some of the parts moved for clarity;

FIG. 4 is a cross-sectional view taken on line 4—4 of FIG. 1 with the positions of some of the parts moved for clarity;

FIG. 5 is a cross-sectional view taken on line 5—5 of FIG. 1;

FIG. 6 is a cross-sectional view taken on line 6—6 of FIG. 1;

FIG. 12 is a cross-sectional view taken on line 12—12 of FIG. 9;

FIG. 15 is a wiring diagram of the electrical system for the apparatus embodying the invention;

FIG. 16 is a plan view of an X-ray film packet;

FIG. 16a is a vertical cross-sectional view of the X-ray film packet opened;

FIG. 17 is a view of the film pick-up jaws shown in FIG. 1 in another position thereof;

FIG. 18 is a cross-sectional view taken on line 18—18 of FIG. 3;

FIG. 19 is a plan view of a detail;

FIG. 20 is a view taken at right angles to FIG. 19; and

Figure 7:
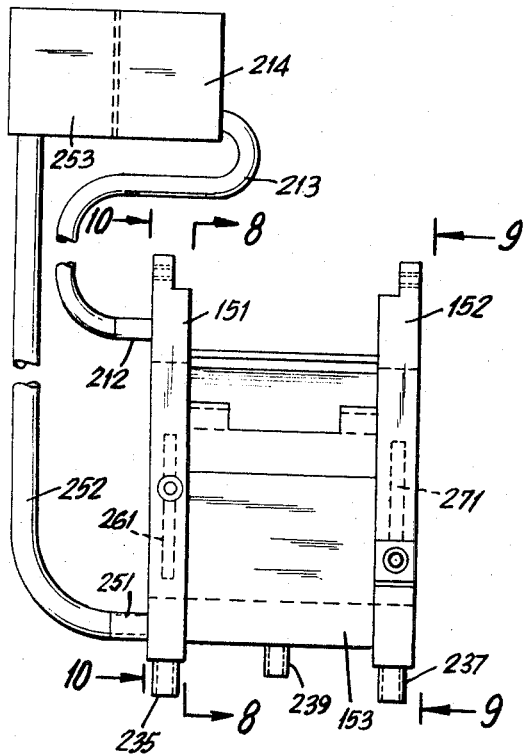
FIG. 7 is a vertical view illustrating the rotary film developing, fixing and washing drum, and the connection of the developing and fixing fluids thereto.
Figure 8:
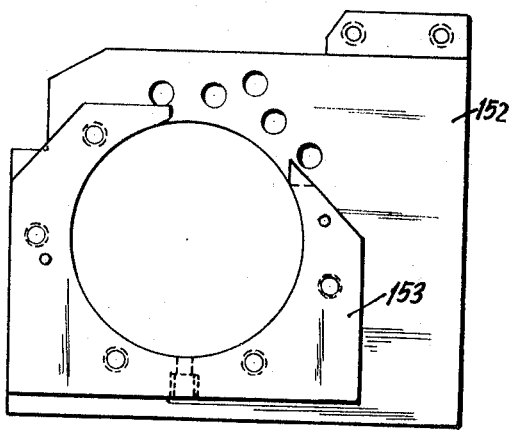
FIG. 8 is a cross-sectional view taken on line 8—8 of FIG. 7.

Referring now in detail to the drawing, 10 designates an apparatus embodying the invention. The same comprises a case 11. Said case 11 has a base plate 12 on which is mounted a case 13. Case 13 has a rear wall 14, side wall 15, top wall 16 and front wall 17. The top wall 16 terminates at its front end rearwardly of the front wall 17, and hinged thereto as at 18 is a door 19. The door 19 comprises a top wall 20 hinged at its rear end at said hinge 18. The top wall 20 is co-extensive with top wall 16. Extending down from the forward end of top wall 20 is a front wall 21 in the plane of the front wall 17. At the lower end of the front wall 21 is a latch 22 for releasably engaging the upper end of the front wall 17. The door 19 closes case 13 in a light proof manner. For the purpose hereinafter appearing, there is provided a microswitch 23 adapted to be closed when the door 19 is closed. The microswitch 23 is normally open.

Mounted on a pair of intermediate vertical side walls 50 and 51 mounted in the case 13, and disposed below the cover 19 and above the level of the upper end of the front wall 17, is a transverse horizontal bracket 25. Bracket 25 is spaced rearwardly of front wall 17. Mounted thereon is a magazine 26 for a stack of film packs 27 (see FIG. 16). The magazine 26 comprises vertical side plates 28 interconnected by a bottom wall 29 and a front wall 30. The front wall 30 may have a downward extension 31 contacting the front edge of the bracket 25 and attached thereto by means of a screw 32 passing through a clearance opening therein and screwed into the bracket 25. The side walls 28 are interconnected by a rear wall 34 formed with a central vertical slot and extending from the upper end of said side walls to a point somewhat above the midheight of said walls. The top rear ends of side walls 28 are interconnected by a bracket 24. Short angles 23 connect bracket 24 to intermediary walls 50 and 51. The side walls 28 are formed with aligned horizontal slots 35 for the purpose hereinafter appearing. Slidable in a suitable opening in a front wall 30 is a plunger rod 36 carrying a piston 37 at its rear end. A coil compression spring 38 is interposed between the piston 37 and a bushing 39 on the front wall 30 and surrounding the opening through which the plunger rod 36 passes. The spring 38 normally biases the piston 37 rearwardly. Pins 40 on the piston pass through the slots 35 serving to guide the piston 37 rearwardly. A stack of film packs 27 is inserted into the magazine 26 so as to be disposed between the piston 37 and the front wall 34. The apparatus for opening said film pack will be described hereinafter.

Each film pack 27 may be a usual film pack for a dental film. The film pack is shown in FIG. 16, and its cross-section after being opened in FIG. 16a. In its open position, the film pack comprises an outer envelope 41 having a front wall 42 and a rear wall 43. The rear wall 43 has a flap 44 at its upper end. The front wall 42 is attached at its sides and lower end to the rear wall 43 of the envelope. The envelope 41 is usually made of white paper. Within the envelope is a usual X-ray dental film 45, disposed within an inner envelope 46 of black paper. The inner envelope 46 comprises a front wall 47 from the lower end of which extends upwardly a rear wall 48 formed with an upwardly extending flap 49. The film 45 is disposed between the front wall 47 and the rear wall 48. A lead sheet 50 is interposed between the front wall 47 of the inner envelope and the front wall 42 of the outer envelope. When the film pack is closed the flaps 44 and 46 are folded downwardly over the lead sheet 50 and front wall 42. After being photographically exposed to X-rays in the usual manner, the film packs, still closed, are placed in magazine 26 with the folded-over flaps 44, 49 facing rearwardly with respect to the magazine.

Means is provided for automatically moving the film packs 27 downwardly with respect to the magazine one at a time. To this end there is mounted within the casing a pair of intermediary vertical parallel walls 50 and 51. Fixed to wall 50, below magazine 26, is an electric motor M1 provided with a motor shaft 53 carrying a gear 54 meshing with gear 55 on a cam shaft 56 journalled in walls 50, 51 and traversing the same. The cam shaft 56 carries a cam member 57 comprising one cam 58 and a second cam 59, see FIG. 3. Cam 58 has a circular edge portion 58a and a cam portion 58b of less radius than the circular portion 58a. Cam 59 has a circular cam portion 59a and a cam portion 59b of less radius than the circular portion 59a.

The walls 50, 51 carry a horizontal transverse cross shaft 60. Fixed to said shaft 60 is an arm 61 carrying a cam follower 62a contacting the edge of cam 58. Fixed to the shaft 60 for oscillation therewith is an arm 62 to the front end of which is notched as at 63 and adapted to move downwardly through the slot in the vertical rear wall 34 of the magazine. Thus as the motor M1 rotates and the cam 58 rotates therewith the arm 62 will be oscillated so that the notch 63 will move the rearmost film pack only downwardly out of the magazine. While the follower 62a is on the circular portion 58a of the cam 58 the arms 61, 62 do not move. Shaft 60 projects outwardly beyond wall 51. A coil torsion spring 60a engaging wall 51 and arm 61 serves to keep the follower 62a against the edge of cam 58.

Walls 50, 51 also support a transverse, horizontal cross shaft 65 located rearwardly of and below shaft 60. On shaft 65 and between walls 50, 51 is a bevel gear 66. Shaft 65 extends outwardly beyond wall 51 and on the outboard portion of said shaft is fixed an arm 67 carrying follower 68 contacting the edge of cam 59. A coil torsion spring 70 on shaft 65 engages wall 50 and said shaft for biasing the follower 68 against the edge of said cam 59. When follower 68 engages circular edge portion 59a of cam 59, shaft 65 does not rotate. However, when the follower 68 engages the cam portion 59b of cam 59 arm 67 is oscillated for oscillating shaft 65.

Interconnecting the walls 50 and 51 is a vertical transverse bracket 72 provided with bearings in which are journalled a pair of longitudinal shafts 73. At the rear end of one of the shafts 73 is a bevel gear 74 meshing with the bevel gear 66. The forward ends of the shaft 73 are journalled in a cross bracket 77. Fixed for rotation with the shafts 73 are pinions 78 which mesh with one another. Thus, oscillation of shaft 65 causes rotation of one of the shafts 73. Rotation of one shaft 73 causes rotation of the other shaft 73 in an opposite direction due to intermeshing of the similar pinions 78. At the front ends of shaft 73 are fixed a pair of similar symmetrically disposed cutters 80 for the envelopes of the film packets 27.

Cutters 80 each have a hooked portion 81 bent forwardly somewhat from the plane of the cutter. These cutters will be rotated first in one direction and then in an opposite direction, by the cam 59 and the gears described above. The hooks 81 will engage beneath the flaps 44, 49 of the rearmost film packet, at about the positions indicated at 27a in FIG. 16, cut or rip the flaps, and move them upwardly to a vertical position. It will be understood that only the flap of the rearmost film packet will be thus cut after the film packet has been moved down by arm 62. The level of the shaft 73 is at the lower end of the magazine 26.

Supported between walls 50, 51 in any suitable manner is a cross shaft 85 disposed below bracket 77 and hence below the shaft 73. On shaft 85 is a roller 86. Between the roller 86 and the shaft 85 is a roller clutch 87 which permits the roller to rotate in a counterclockwise direction, looking at FIG. 1, but prevents it from rotating in a clockwise direction. The shaft 85 may be kept from rotating by means of strips 88 attached to walls 50 and 51 and engaging flat transverse edges 89 of said shaft, (FIG. 6). Attached to the rear end of the bracket 25 is a guide plate 90 having a downwardly extending lip 91 parallel to and spaced from the flap openers or cutters 80 to guide the downwardy moved film packet into engagement with the roller 86.

Means is provided for moving the opened packet downwardly after it has been moved down by arm 62 and the flap has been opened and lifted upwardly. To this end there is mounted between the plates 50 and 51, cross shaft 93 parallel to and spaced from the shaft 85. A second shaft 94 is mounted on and between the walls 50, 51 and disposed below the shaft 93. On shaft 93 is a pulley 93a and on shaft 94 is a pulley 94a. Belt 95 extends around the pulleys 93a, 94a. The downwardly moved packet moves between the rear side of the belt 95 and the roller 86. Means is provided for moving the belt 95. To this end a second motor M2 is provided. The motor M2 has a motor shaft 96 carrying a pinion 97. Pinion 97 meshes with a pinion 98 on a shaft 94. When motor M2 operates, the belt 95 moves in direction shown in FIG. 1 of the drawing; the rear run of the belt moving downwardly. This movement of the belt causes the packet, which is received between the belt and the roller 86, to move downwardly. Fixed to a fixed bracket 99 within the casing is a spring arm 100 which serves to press the packet against the rear run of belt 95 as it moves downwardly. The arm 100 slants downwardly and forwardly as shown in FIG. 1 of the drawing. Fixed to another bracket 101 in the casing is a second arm 102 disposed below the arm 100 and it also serves to press the packet against the belt. Walls 50, 51 are provided with horizontal slots 104 having upper and lower horizontal edges 105. Slidable in each of the slots is a slider 106 formed with a through opening 107 and having a flat surface 108, and formed with a pair of grooves 109 to receive the edge portions of the walls 50 and 51. Extending through the openings 107 is a cross shaft 110. Attached to the walls 50, 51 are brackets 112 receiving horizontal coil compression springs 113 engaging the flat surfaces 108. On shaft 110 is a roller 114. The shaft 110 is substantially at the level of the shaft 94. The roller 114 is hence pressed against the belt 95 by the springs 113. The film packet which passes downwardly between the spring arm 102 and the belt 95 comes between the yieldingly pressed roller 114 and the belt. A microswitch 116 has an arm pressed against the lower end of the belt. When the film packet enters between the arm of the microswitch and the belt, switch 116 opens, which stops the motor M2 as will appear more clearly hereinafter. After the film 45 is removed from the packet as will be described next, the empty packet is discharged when the belt moves again past the roller 114 which may move to allow its discharge by virtue of sliders 106 on shaft 110 as described above. As the packet 41 moves down, leaf spring 100 holds the flaps open.

Means is provided for removing the film 45 from each opened up film packet 27 as the latter reaches arm 102 and is held against the belt by said arm. To this end there is fixed to the inner sides of walls 50, 51, a pair of similar, symmetrical brackets 120 having upwardly extending parallel flanges 121 disposed in vertical planes parallel to walls 50, 51. Flanges 121 are formed with horizontal slots 122. Slidable and rotatable in slots 122 is a cross-pin 123 to which is attached one end of a bar 124 which projects forwardly. Attached to the forward end of bar 124 is a gripper member 125 provided at its forward end with a downwardly extending pointed gripper jaw 126. Attached to the inner face of gripper jaw 126 is a strip 127 of rubber or like high friction resilient material.

Pivoted to member 125 as at 128 is a second gripper member 130 provided with a gripper jaw 131 opposed to gripper jaw 126 and carrying a bump 132 of a plastic such as nylon or like material of low friction properties.

A coil tension spring 133 interconnects members 130 and 124 tending to close jaws 131, 126. Spring 133 has one end thereof passing through a suitable opening in bar 124. Adjacent its outer end, opposite low friction member 132, jaw 130 is provided with an extending pin 130a. The other end of spring 133 is fixed to extending pin 130a. Pin 130 extends substantially the full distance between plates 50 and 51.

A pair of members 134 are fixed to supports 50 and 51 above and rearwardly of shaft 85. Extending rearwardly of each member 134 is a concave downwardly curved, flat leaf spring 134a. The rear end of each spring 134a has an outwardly extending lug which is freely received in an opening 134b in the respective support 50 or 51. A stop member 134c is fixed to each support rearwardly and below opening 134b. The rear end of springs 134 are normally in the FIG. 1 position, that is, at the lower portion of opening 134b. The parts are so positioned that, as pin 130a reaches the end of its rearward travel, to be described hereinafter, it would be normally located above the rear ends of springs 134a. Therefore, when pin 130a reaches the end of its rearward travel, the rear ends of springs 134a move up in openings 134b to allow pin 130a to pass and thereafter the springs return to the FIG. 1 position. When the pin 130a again moves forwardly, to be described hereinafter, it will be located above springs 134a, see FIG. 17, and as the jaws approach the point of picking up another film, the springs 134a, acting on pin 130a, will cause the jaws to open against the force of spring 133, as shown in FIG. 17. The forward end of springs 134a are at a position substantially corresponding to the end of the forward motion of the jaws, so that the pin 130a will fall off springs 134a and spring 133 will close the jaws on the film before the jaws start their rearward motion.

Mounted on respective walls 50 and 51 are a pair of short shafts 135 each carrying a pinion 136, each outboard of a support, see FIG. 4. Shafts 135 are connected to pin 128 by a pair of arms 137.

Mounted on and between walls 50, 51 is a cross shaft 140 to which is fixed a pair of segmental gears 141 each meshing with a pinion 136. Also fixed to shaft 140 is an arm 142 to the outer end of which is pivoted as at 143, a link 144 pivoted as at 145 to cam 58. It will now be understood that as motor M1 is operating and cam 58 rotates, arm 142 will be oscillated 90° to cause oscillation of segmental gear 141 and hence of pinions 136, and of shafts 135 through 180°.

Oscillation of pinions 136 causes oscillation of arms 137, thereby causing pin 123 to reciprocate in slots 122. Pinions 136 are oscillated 180°. As arms 137 are rotated in a counterclockwise direction from the position of FIG. 1, pin 123 moves forwardly in slots 122. Gripper jaw 126 contacts the rear surface of wall 49 of the sheet 46 of the packet held by leaf spring 102 against the roller, and moves between said wall and film 45. Film 45, wall 47 of sheet 46 and lead sheet 50 are wedged between jaw 126 and plastic bumper 132. At this point the direction of rotation of pinions 136 are reversed causing arms 137 to move in a clockwise direction looking at FIG. 1. The high friction piece 127 grips the back of film 45 to raise up the film, but bumper 132 slides along lead sheet 50, leaving the packet where it is. Bumper 132 then slides against the rear surface of the raised film 45 so that said film is gripped between jaws 126, 131 and is lifted up out of the film packet 27.

As the pinions 136 continue to rotate, pin 123 continues to move rearwardly in slots 122 and arms 137 continue to rotate in a clockwise direction, looking at FIG. 1. At this time pins 130a are on the underside of springs 134a. This movement continues until pin 130a strikes stop 134c and causes block 134 and hence jaw 130 to rotate in a counterclockwise direction relative to member 125, thereby opening jaws 126, 130 and releasing the film 45. At this time, the film has already been inserted between a pair of rollers 145, 146 to be described in detail hereinafter.

The rollers 145, 146 are carried by parallel, horizontal shafts 145a, 146a which carry meshing similar pinions 145b, 146b.

Shaft 146a carries a sprocket wheel connected by a sprocket chain 147 to a sprocket wheel carried by shaft 53. Thus when motor M1 is operating, shaft 146a will rotate in a clockwise direction, looking at FIG. 3, and rollers 146, 145 will rotate in opposite directions to move the film inserted between said rollers, downwardly. Shafts 145a, 146b are suitably supported on walls 50, 51.

Supported on the base 12 of the casing 11, is a developing, fixing and washing apparatus 150. Said apparatus 150 comprises a pair of vertical, parallel steel plates 151, 152 formed with similar, aligned circular openings 151a, 152a, respectively. Plates 151, 152 are fixedly mounted on base 12. Shafts 145a, 146a are mounted on said plates and are disposed between said plates, above and on opposite sides of a vertical plane passing through the axis of said circular openings 151a, 152a. Mounted between and fixed to said plates 151, 152 is a housing 153 for rotatably supporting a drum 154. Housing 153 is attached to plates 151, 152 by cross bolts B. Housing 153 has a part circular inner bore 153a of the same diameter as circular openings 151a, 152a and registering therewith.

Drum 154 comprises end parts 155 and 156, and a center part 158, all attached together by tie bolts 157. Drum 154 could also be fabricated all in one piece as by coating. Parts 155, 156 and 158 are made of plastic. Drum 154 rotates relative to plates 151, 152 and housing 153. Part 155 has a reduced annular portion 155a journalled in opening 151a and partly projects into bore 153a. It has an annular outwardly extending flange 155b contacting the outer surface of plate 151.

Part 156 has a reduced portion 156a journalled in opening 152a and bore 153a and contacting part 155. It also has an outwardly extending annular flange 156b contacting the outer surface of plate 152.

Means is provided to rotate the drum 154 in a counterclockwise direction, looking at FIG. 1. To this end, there is provided a third motor (drum motor) M3 having a motor shaft 160 carrying a small pinion 161 meshing with a larger pinion 162 on an axial stud shaft 163 formed on drum 154 and projecting outwardly therefrom. Four revolutions of shaft 160 cause one revolution of pinion 162 and hence of drum 154.

Shaft 160 also carries a larger pinion 165 meshing with a small pinion 166 carried by shaft 167 supported by and between plates 151, 152. Pinion 166 meshes with a similar pinion 168 carried on shaft 169 also supported on and between plates 151, 152. Shafts 167, 169 carry contacting rollers 167a, 169a, respectively, disposed between said plates 151, 152.

The radial distances from the axes of drum 154 to the axes of shafts 145a, 146a, 167 and 169, are equal.

Drum housing 153 is cut away as at 154a to allow film passing between rollers 145, 146 to move into the drum 154 in the manner hereinafter explained, and to allow the film to pass out of the drum between the rollers 167a, 169a, in the manner hereinafter explained. Roller 167a rotates in a counterclockwise direction and roller 169a rotates in a clockwise direction, looking at FIG. 1, to move film radially outwardly. Part 155 of the drum has an axial stud 170 carrying three cams 171, 172, 173 for controlling three switches 171a, 172a, 173a, respectively. Switch 171a is normally closed, switch 172a is normally open and switch 173a is normally open.

Center portion 158 of the drum 154 is formed with a diametric slot 175 having a bottom surface 176. At the ends of surface 176 are cavities 177 for small coil compression springs 178. A U-shaped film holder 180 slides diametrically into said slot 175. Said holder 180 has side arms 181 interconnected by a bottom portion 182. Arms 181 are formed with inner grooves 181a to receive the side edges of film 45. The springs 178 are compressed when the holder 180 is fully pressed down into slot 175, in the manner hereinafter appearing, and serve to push the holder radially outwardly when pressure is removed from said holder.

Means is provided for depressing the holder 180 fully into the drum, to compress the springs 178. To this end, shaft 160 carries a cam 185 having a high cam part 185a extending about 180° around said cam. Mounted on and between plates 151, 152 is a shaft 187 disposed between rollers 146 and 167a. Carried by said shaft 187 are a pair of similar, aligned rockers 188 disposed at opposite ends of rollers 145, 146, 167a, 169a. Said rockers have arms 189 adapted to depress the film holder 180 when said film holder is disposed between rollers 145, 146, and arms 190 to hold back the film holder until the drum has rotated to a position where the holder is between the rollers 167a, 169a where the processed film comes out of the drum and between said rollers.

Fixed to said shaft 187 is an arm 192 carrying a follower 193 held in contact with the outer edge of cam 185 by a coil torsion spring 196 interconnecting said arm with a fixed point of the casing. As cam 185 rotates it will oscillate the rocker in opposite directions during each revolution of said cam.

Drum part 155 is formed with a radial inlet port 200 extending to a central opening 201 communicating with slot 175. Slot 175 is wider than the holder, and opening 201 is wider than the holder so that liquid passing into port 200 will enter slot 175 to process the film 45 carried by said holder.

Part 156 has a radial air outlet port 202 communicating with a central opening 203 also communicating with slot 175 so that as liquid enters port 200, air can escape through port 202.

Plate 151 is formed with a through opening 205 extending from an inclined edge 206 of said plate to opening 151a. The outer end of port 205 is closed by a screw 207. At its inner end, port 205 has a counterbore 208 in which an O-ring 210 is placed.

Plate 151 is formed with a threaded hole 211 communicating with bore 205, and threaded into said threaded hole is an inlet tube 212. Tube 212 is connected by flexible tube 213 (FIG. 7) to the outlet of a sealed tank or the like 214 containing developing fluid. Port 205 is so located that the drum is rotated about 40° in a counterclockwise direction from initial position before port 200 registers with port or hole 205 to receive developer liquid therefrom. Suitable means are provided to heat the developer and fixer fluids before their entry into the drum to speed the developing process.

Figure 9:
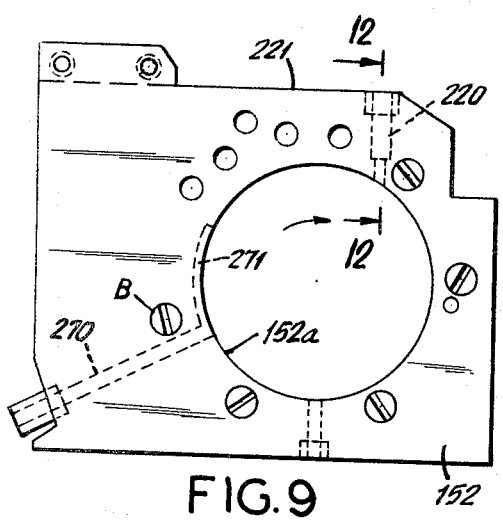
FIG. 9 is a vertical view taken on line 9—9 of FIG. 7.

Plate 152 is provided with means to allow air to escape from port 202 and yet prevent liquid from escaping therefrom. To this end wall 152 is formed with a port 220 extending vertically from a top edge 221 (FIGS. 9 and 12) to the inner opening. The upper end of port 220 is closed by a tubular nut 223 which is provided at its lower end with an inverted, inclined valve seat 224. Port 220 has a shoulder 225 on which rests a float valve 226 having a conical upper end 227. Valve 226 has a hollow underside 226a and is formed with slots 228 communicating with its hollow 226a. The lower end of port 220 is at same angle as the lower end of port 205 so that when developer fluid is entering port 200, air may escape from port 202. This air coming up from port 202 can escape through slots 228 and tubular nut 223 while developer liquid enters the drum. However, if liquid comes up into port 220, the float 226 will come up and close the valve seat 224 to prevent loss of liquid.

As the drum 154 slowly turns, the developer liquid will develop the film.

Means is provided to drain the developer liquid from the drum when the drum has rotated about 180° and ports 200, 202 extend downwardly. To this end base 12 is formed with three vertical aligned through openings 231, 232, 233. Plate 151 is formed with a vertical through hole 234 countersunk at its lower end and extending from opening 151a to opening 231. A tube 235 projecting into the countersunk portion of opening 234, extends down into opening 231.

Plate 152 is formed with a vertical through hole or opening 236 countersunk at its lower end and connecting opening 152a with opening 233. A tube 237 has its upper end fitted into the countersunk portion of opening 236 and projects down into opening 233.

Drum housing 153 has a vertical hole 238 communicating with bore 153a. A tube 239 fitted into opening 238 projects down into opening 232.

Figure 11:
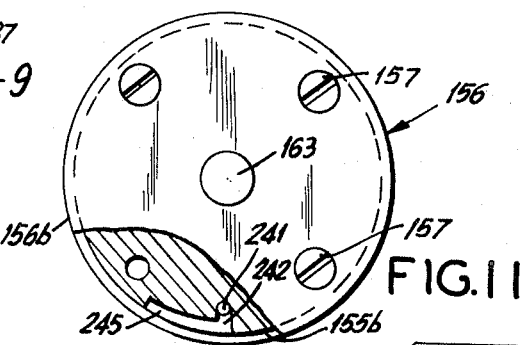
FIG. 11 is a side vertical view of a part of the drum with parts broken away and in cross-section.

When the drum rotates 180° from initial position, ports 200, 202 will be aligned with openings 234, 236 respectively, and slot 175 will register with opening 238, so that all the developer liquid will be quickly drained. Means is provided to let air enter the drum while developer liquid is draining from the drum. To this end drum portion 158 is formed with a horizontal passage 240 communicating with cavities 177. Passage 240 communicates with a horizontal passage 241 in drum part 156. Extending from passage 241 is a radial passage 242 extending to bore 153a. Drum part 156 is formed at its outer surface with a peripheral passage 245 (FIG. 11) extending from the outer end of passage 242 in a direction opposite to the direction of rotation of the drum. When ports 200, 202 register with ports 234, 236, respectively, passage 242 will be at the top of the drum, but passage 245 will connect passage 242 to air port 220 so that air entering said air port can pass into the drum so as not to impede drainage of developer fluid therefrom.

Means is provided to supply the drum with fixer liquid to fix the film, after the developer liquid has been drained. To this end plate 151 is formed with a port 250 at a small angle beyond the drain opening and extending to opening 151a. An O-ring 250a is located at opening 151a. Port 250 is closed at its outer end by a plug. Plate 151 is formed with a nipple 251 communicating with port 250 but extending to the outside of plate 151. Nipple 251 is connected by hose 252 to a fixer tank 253. When port 200 registers with port 250, as the drum continues to rotate, fixer liquid will enter the drum to fix the developer film. During this time air will escape through port 221 by passing through passages 241, 242, 245.

Figure 10:
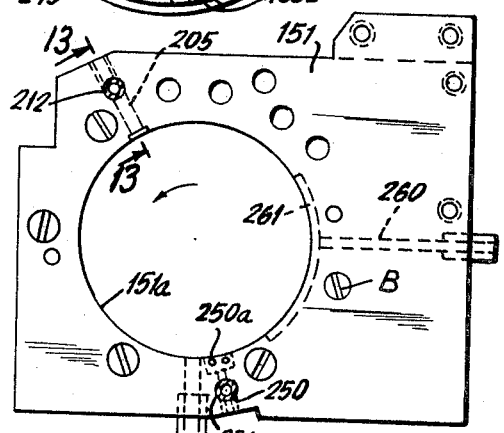
FIG. 10 is a cross-sectional view taken on line 10—10 of FIG. 7.

Means is provided to flush out the fixer liquid and wash the fixed film after the fixing process has taken place. To this end plate 151 is formed with a horizontal port 260 (FIG. 10) extending from a vertical edge of said plate to the opening 151a. Said plate 151 at the inner edge of said opening 151a is formed with a peripheral groove 261 extending to both sides of opening 260 and communicating therewith. As the drum rotates past port 250, fixer can no longer enter the drum.

Plate 152 is formed with a water drain port 270 below the horizontal level of port 260. Port 270 extends from an outer edge of plate 152 to the opening 152a. Plate 152 is formed with an internal groove 271 extending upwardly from the inner end of port 270. Passage or port 260 is connected to a water supply. Passage 270 is connected to a water drain.

The water inlet to port 260 is supplied with an electrovalve 273 (FIG. 15).

When port 200 reaches groove 261 water will enter the drum. Also when port 202 reaches groove 271 fixer will drain out through port 270. Thus there is a continuous flushing of washing water around the film, in through port 260 and out through port 270. This wash flushes out the fixer solution and washes the film.

As the drum continues to rotate to initial or starting position, whatever liquid remains in the drum drains out through ports 238 and 236.

As the slot 175 comes to a point between the rollers 167a, 169a, springs 178 will push the film holder 180 up, and the edges of the film 45 in the holder will wedge between said rollers and will be removed from the holder. The rocker arm 190 will then push the holder back into the drum and the drum will return to its starting position. Between rollers 146 and 167a, the rocker may have an extension 190a which serves to prevent the holder from being pushed by the springs between said rollers, which might damage the holder and/or rollers.

Means is provided to dry the film coming out of the drum. To this end, a curved chute 280 is located to receive the film passing through the rollers 167a, 169a.

In the casing 11 is a box 281 supported on the base 12 by means of a bracket 282. Box 281 has an opening 283 within which are suitably mounted opposed friction rollers 284. Rubber wipers 285 attached to the box at its opening 283 contact the rollers 284 to keep hot air in the box from escaping.

Within the box are two pairs of opposed rollers 286, 287. Between rollers 284, 286, 287 are guides 289, 290 to contact the opposite edges of the film. Suitable drive means are provided for rotating rollers 284, 286, 287 at suitable speed and in directions to move the film through the box. These drive means comprise a motor M4 mounted on base 12. A belt 288 connects the shaft of motor M4 to one roller 287. Each pair of rollers 284, 286 and 287 are geared or belted together so that rotation of one roller of one pair causes rotation of the other roller of the pair in the opposite direction. A belt 289a connects one roller of each pair together. Thus motor M4 causes all the rollers to rotate in the directions shown by the arrows in FIG. 1. An exit guide 291 passes through the box to deliver the film to an opening 292 in casing wall 14. A pair of contacting rubber wipers 292a are provided to prevent light from entering the casing through opening 292.

Pairs of slotted tubes 294 are placed at opposite sides of guides 289, 290. These tubes are supplied with hot air. The slots in the tubes face the guides so that hot air passing through the tubes will impinge on the film being moved through the guides. Air is supplied to pipes 294 by a fan 295 (FIG. 15) connected in parallel circuit with an electric heater 296 for heating the air blown by the fan to the pipes 294.

The developer supply and fixer supply 253, 214 are provided with an electric heater 297 (FIG. 15).

For the purpose hereinafter appearing, cam shaft 56 carries a pair of cams 300, 301 (FIG. 2) controlling a pair of switches 300a, 301a, respectively.

The wiring diagram of FIG. 15 will now be explained. In said diagram wires L, L1 are the power leads. A manual main switch 310 connects these leads to a power supply. The heater 297 for the fluids is connected to leads L, L1 by wire 311. A thermostatic switch 312 is interposed in wire 311 in series circuit with the heater coil 297 to maintin constant temperature of the fluids.

Switches 23 and 171a are connected in series circuit with main motor M1, across the leads L, L1 by wires 313.

Switch 301a is connected by wire 314 to lead L and by wire 315 to movable switches 316, 316a and to one side of relay coil 317. The other side of coil 317 is connected to lead L1 by wire 318. When coil 317 is energized it moves the contacts 316, 316a into engagement with fixed contacts 319, 319a, respectively.

Fixed contact 319a is connected by wire 320 to one side of belt motor M2. The other side of said motor is connected by wire 321 to lead L1.

Fixed contact 319 is connected by wire 322 to a fixed contact 323 of switch 116. Said switch 116 is connected by wire 324 to wire 314.

Switch 300a is connected by wire 325 to lead L. Said switch 300a has a fixed contact 326 connected by wire 327 to one side of drum motor M3. The other side of motor M3 is connected by wire 327 to lead L1.

Normally open switch 172a is connected by wire 328 to wire 325. Said switch has a fixed contact 329 connected by wire 330 to a fixed contact 331. A switch 332 movable into engagement with said fixed contact 331, is connected by wire 333 to wire 327 and is also connected to one side of a relay coil 334. The other side of coil 334 is connected by wire 335 to lead L1. Coil 334 when energized causes switch 332 to move into engagement with fixed contact 331.

The fan 295, motor M4, and heater 296 are connected in parallel circuit with the motor M3, by wires 340, 340a and 341, respectively, and in series with switch 300a.

Normally open switch 173a is connected by wire 343 to lead L. Said switch 173a comprises a fixed contact 345 connected by wire 346 to one side of coil 273a of the electro valve 273. The other side of coil 273a is connected by wire 344 to lead L1.

Figure 21:
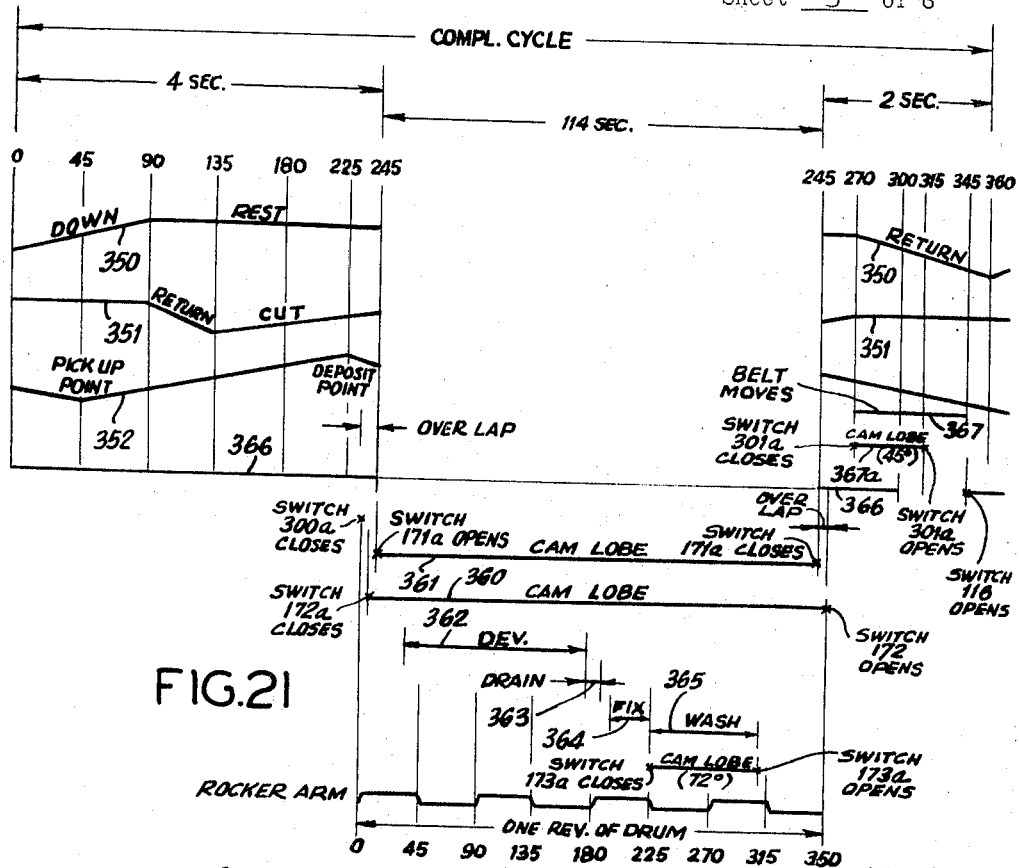
FIG. 21 is a timing chart of the apparatus for one complete cycle.
Figure 14:
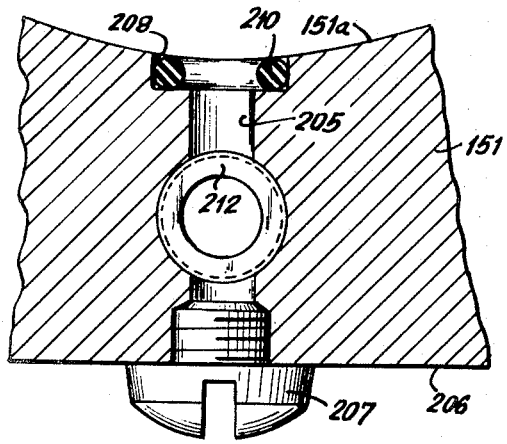
FIG. 14 is a cross-sectional view taken on line 14—14 of FIG. 13.
Figure 13:
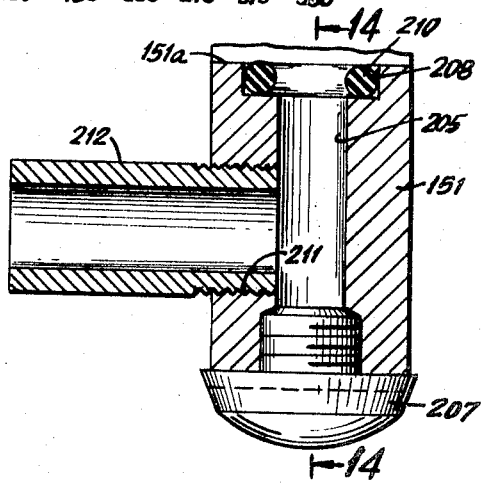
FIG. 13 is a cross-sectional view taken on line 13—13 of FIG. 10 reversed.

The time chart shown in FIG. 21 will now be explained. The main motor M1 may take six seconds for a complete revolution of cam shaft 56 and the drum motor M3 may take 114 seconds for a complete revolution of the drum. The chart of FIG. 21 is drawn with these speeds, although of course the speeds may be changed. The main motor stops rotating after about four seconds. Just before it stops, the drum motor starts rotating, and just before it stops rotating, the main motor starts rotating and continues for about two more seconds to complete the cycle.

In the chart, the first and second periods of revolution of the main motor M1 are laid out in degrees of one complete revolution of the cam shaft 56. Hence there is about 245° in the first movement of the cam shaft 56, and about 115° in the second movement of said cam shaft.

In the chart line 350 indicates movement of arm 62. Arm 62 moves down during the first 90° of movement of the cam shaft 56 to move the first packet downwardly, then it stops moving, and moves up between 270° and 360° of revolution of the cam shaft to the start position in preparation for the next cycle.

In the chart, line 351 indicates the movement of the cutter blades. These blades are at rest during the first 90° revolution of the cam shaft 56 while a packet is being pushed out of the magazine. They rotate in a return direction between 90° and 135° of rotation of the cam shaft, and move in a reverse or cutting direction between 135° and 270° of rotation of the cam shaft to open the packet and lift the flap, and stop rotating from about 270° to 360° of rotation of the cam shaft.

In the chart, line 352 indicates movement of the film pick up and deposit mechanism. The gripping jaws move down during the first 45° of rotation of the cam shaft. They move up from 45° to 225° of rotation of the cam shaft. At 225°, the film is deposited in the drum. From 225° to 360° the jaws move in an opposite direction back to the pick up point. The manual switches 310 are first closed to put the apparatus into operation. When the thermostatic switch 312 closes, the heater for the developer and fixer tanks is energized to heat the liquids in said tanks.

When the cover 19 for the casing is closed, normally open switch 23 is closed. It is assumed that film packets have been placed into the magazine 26.

Closure of switch 23 will energize the main motor through normally closed switch 171a.

At this time there is no film pack between belt 95 and roller 114 and hence switch 116 is closed since it is a normally closed switch. The belt motor M2 is not yet energized by the closing of switch 301a by cam 301 on the main motor shaft.

When the main motor is energized, the cam shaft 56 begins to rotate. After about 235° of rotation of the cam shaft 56, switch 300a closes, thereby closing the circuit to the drum motor M3 and at the same time closing the circuit to the relay coil 334 to cause switch 332 to move into engagement with fixed contact 331. Switch 330a is kept closed just long enough for switch 172a to be closed by cam 172 on the drum motor. This occurs at about 240° of rotation of the cam shaft 56. Then switch 300a opens, but the drum motor remains energized through the holding circuit which includes now closed switches 172a and 332. This period is indicated on the chart by line 360.

When the cam shaft 56 has rotated 245°, switch 171a opens to stop rotation of main motor M1, as indicated by line 361 in the chart.

Rotation of the drum continues until the drum has made a complete revolution. During such revolution, which may take any predetermined period, 114 seconds for example, developer fluid processes the film from about 35° after start of revolution of the drum, to about 175° of its revolution, as indicated by line 362 on the chart. Drain of developer may take place between 175° and 185° of revolution of the drum as indicated by line 363 on the chart. The fixing processes may take place between about 185° and 225° of revolution of the drum as indicated by line 364 of the chart. At this point switch 173a is closed to energize the coil for the electro valve 273 to start supply of water for the flush and wash process. The cam lobe on cam 173 which controls switch 173a extends for about 72° of rotation of the drum, at which point switch 173a again opens to stop supply of water to the drum. This period is indicated by line 365 of the chart.

After the drum has rotated about 350° to 355°, switch 171a closes to again energize the main motor M1. After the drum has rotated the full 360° switch 172a opens to de-energize the drum motor M3, and the drum stops rotating. It will be understood that while the drum motor is energized, the fan 295 and the heater 296 for the air blower by the fan to the drier tubes 294 are also energized to dry the developed film.

When the cam shaft 56 reaches the 270° point, switch 301a is closed to energize relay coil 317 to close switches 316, 316a for energizing the belt motor M2 to cause the belt to move down. Switch 301a remains closed between 270° and 315° of rotation of the cam shaft as shown by line 367a on the chart, in order to allow the belt to move sufficiently to discharge the empty film packet lift from the last cycle.

If there is no packet between belt 95 and roller 114 switch 116 is closed since it is a normally closed switch, and opening of switch 301a does not prevent energization of the belt motor M2 which remains energized through the holding circuit including switches 116, 316, 316a as indicated by line 367 on the chart. If there is an empty film packet between the belt 95 and roller 114, left from the last cycle, when switch 301a is closed, the belt will be moving and drive the empty packet out when the cam shaft reaches about 300° of rotation, at which point switch 116 will close and the belt motor will remain energized after switch 301a opens through the holding circuit. The belt motor remains energized until the cam shaft reaches about 345° of rotation at which point a new film packet comes between the belt 95 and roller 114 to open switch 116 and stops rotation of the belt. Thus belt 94 moves during rotation of the cam shaft from 270° to 345°, as indicated by line 367.

After the cam shaft has made a complete rotation of 360°, it continues rotating for the next cycle because switch 171a is still closed, and a second cycle commences.

It will thus be seen that there is provided an apparatus in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

We claim:

1. In combination, a container having means to receive an exposed film, means to supply developer liquid to said container for developing a film in said container, means to drain said developer liquid from said container, means to automatically thereafter supply fixer liquid to said container to fix the developed film, means to automatically thereafter supply water to said container and drain said fixer liquid and water from said container to flush the fixer liquid from said container and wash said developed and fixed film, and means to thereafter automatically remove the developed, fixed and washed film from said container, and means to automatically insert film into said container, and means controlled by said inserting means to control said means to supply developer liquid to said container.

2. The combination of claim 1, and means to blow air onto the film removed from said container, to dry said film.

3. The combination of claim 1, means to open an envelope of a film packet comprising an envelope containing a film, and means to extract the film from the opened up envelope, and means controlled by said extracting means to control said insert means.

4. The combination of claim 3, a film packet magazine to contain a stack of said film packets in said magazine, means to advance said stack of film packets in one direction in said magazine, means to move the leading end packet of said stack away from said magazine, and means controlled by said moving means to control said envelope opening means.

5. The combination of claim 3, a magazine, to hold a stack of said film packets, means to move an end packet of said stack from said magazine to a first position, motor means to activate the moving means, and means controlled by said motor means to actuate said means to open said envelope at said first position.

6. The combination of claim 5, means to further move said opened envelope from said first position to a second position, and means controlled by said motor means to activate said extracting means, at said second position.

7. The combination of claim 6, said container comprising a rotary drum having means to receive said extracted film, and means to rotate said drum including another motor means, and means controlled by the first mentioned motor means to control said second mentioned motor means.

8. In combination, a container having means to receive an exposed film, means to supply developer liquid to said container for developing a film in said container, means to drain said developer liquid from said container, means to automatically thereafter supply fixer liquid to said container to fix the developed film, means to automatically thereafter supply water to said container and drain said fixer liquid and water from said container to flush the fixer liquid from said container and wash said developed and fixed film, means to vent air from said container as said developer liquid is supplied thereto and as said fixer liquid is supplied thereto, said vent means comprising float valve means to automatically close said vent means when a liquid reaches said float valve means.

9. In combination, a container having means to receive an exposed film, means to supply developer liquid to said container for developing a film in said container, means to drain said developer liquid from said container, means to automatically thereafter supply fixer liquid to said container to fix the developed film, and means to automatically thereafter supply water to said container and drain said fixer liquid and water from said container to flush the fixer liquid from said container and wash said developed and fixed film, means for mounting said container for rotation, and means to rotate said container, means to open an envelope of a film packet containing a film, means to extract the film from said opened envelope and insert the extracted film into said container, and means controlled by said extracting and inserting means to control said container rotating means.

10. In combination, a film packet magazine to contain a stack of film packets each comprising an envelope with a film therein, means to advance said stack of packets in one direction in said magazine, means to move the leading end packet of said stack from said magazine to a first position, first motor means to activate said moving means, means controlled by said first motor means to open the envelope of said moved packet in said one position, means to further move said moved packet with its envelope opened to a second position, and means controlled by said first motor means to extract said film from said opened envelope in said second position.

11. The combination of claim 10, a rotary drum having means to receive a film, means associated with said extracting means to insert said extracted film into said receiving means, means to rotate said drum, including second motor means, and means controlled by the first motor means to control the second motor means.

12. The combination of claim 11, and means controlled by the second motor means to control the first motor means.

13. The combination of claim 12, third motor means to actuate said means for moving said packet from said first position to said second position, and means controlled by the first motor means to control said third motor means.

14. The combination of claim 13, and means controlled by a moved packet to further control said third motor means.

15. In combination, means to hold a stack of sealed packets each containing an exposed film, means to move an end packet of the stack away from said stack, means controlled by said moving means to open said moved packet, means to photographically develop, fix and wash film, and means controlled by said moving means to withdraw the film from said opened packet and deposit the withdrawn film at said developing, fixing and washing means.

16. The combination of claim 15, said means to develop, fix and wash including a container, means to supply developer and fixer solutions and water, in sequence, to said container, and means to heat said developer and fixer solutions in said container.

17. The combination of claim 15, and means to advance the stack of packets in one direction.

18. The combination of claim 15, and means to automatically remove the developed, fixed and washed film from said developing, fixing and washing means.

19. The combination of claim 15, means to move the opened packet from said packet opening means to said film withdrawal means, electrical circuit means; said circuit means comprising a first motor for said moving means and said packet opening means; a second motor for said opened packet moving means, a third motor for said film developing fixing and washing means, means controlled by said first motor to control said third motor, means controlled by said first motor to control said second motor, means controlled by said third motor to control said first motor, and switch means controlled by said packet when said packet is at said point of film withdrawal to control said second motor.

20. The combination of claim 15, and means controlled by said moving means to dry said developed, fixed and washed film.

21. The combination of claim 20, and means controlled by said moving means to move the dried film to a discharge location.

22. The combination of claim 15, said moving means comprising a support means, said stack holding means being mounted on said support means, a motor mounted on said support means, a cam shaft, drive means connecting said motor with said cam shaft, a cam on said cam shaft, a pivot shaft mounted on said support means, a first arm on said pivot shaft extending therefrom, a cam follower on said first arm, means to bias said cam follower towards and into engagement with said cam, a second arm on said pivot shaft extending therefrom to said stack holding means, said second arm being formed with means engageable with said end packet, said cam having means to cause said second arm to move said end packet downwardly to said opening means upon moving said first arm upwardly.

23. The combination of claim 22, said means to open said packet comprising a pair of shafts rotatably mounted on said support means, the axes of said pair of shafts being disposed perpendicular to the plane of motion of said packet away from said stack, means to connect said pair of shafts for rotation in opposite directions, a second cam on said cam shaft, and means controlled by said cam shaft to oscillate one of said pair of shafts, each of said pair of shafts having one end provided with packet opening blade means.

24. The combination of claim 15, support means; said film withdrawing and depositing means comprising a motor, a drive arm mounted on said support means for oscillation, means interconnecting said drive arm and motor to cause oscillation of said drive arm, a pair of jaws pivotally mounted on said drive arm on a common pivot, means interconnecting said jaws to bias said jaws closed, means to open said jaws at said film developing, fixing and washing means, and means to hold said jaws open against the force of said biasing means as said drive arm oscillates from said film developing, fixing and washing means towards said point of film withdrawal until said jaws arrive at said point of film withdrawal.

25. The combination of claim 24, one of said jaws having a pin and slot connection with said support, said slot being disposed perpendicular to the plane of motion of said end packet away from said stack, said means to open said jaws at said film developing, fixing and washing means comprising means on said support engageable with means on the other of said jaws to open said jaws against the tension of said biasing means, said means to hold the jaws open comprising a leaf spring engaging means on said other of said jaws, and said leaf spring terminating to permit the leaf spring means engaging means on said other of said jaws to ride off said leaf spring means and permit closing of the jaws by said biasing means substantially at said point of film withdrawal.

26. The combination of claim 24, the gripping surface of one of said jaws having a higher coefficient of friction than the gripping surface of the other of said jaws.

References Cited
UNITED STATES PATENTS

| | | | |
|---|---|---|---|
| 3,074,713 | 1/1963 | Sano | 217—64 |
| 3,076,965 | 2/1963 | Simjian. | |
| 3,192,845 | 7/1965 | Schmidt | 95—89 |
| 3,202,072 | 8/1965 | Limberger | 95—89 |
| 3,271,571 | 9/1966 | Klem et al. | 95—89 XR |
| 3,280,716 | 10/1966 | Gall | 95—89 |
| 3,165,049 | 1/1965 | Dick | 95—89 |

NORTON ANSHER, *Primary Examiner.*

FRED L. BRAUN, *Assistant Examiner.*

U.S. Cl. X.R.

95—89